US010467909B2

(12) United States Patent
DeBusk et al.

(10) Patent No.: US 10,467,909 B2
(45) Date of Patent: Nov. 5, 2019

(54) AUTOMATIC DEPENDENT SURVEILLANCE BROADCAST SYSTEM BEACON AND METHOD

(71) Applicant: FreeFlight Acquisition Corporation, Irving, TX (US)

(72) Inventors: John DeBusk, Southlake, TX (US); William Luetkemeyer, Azle, TX (US)

( * ) Notice: Subject to any disclaimer, the term of this patent is extended or adjusted under 35 U.S.C. 154(b) by 328 days.

(21) Appl. No.: 14/990,457

(22) Filed: Jan. 7, 2016

(65) Prior Publication Data

US 2016/0225267 A1 Aug. 4, 2016

Related U.S. Application Data

(60) Provisional application No. 62/100,792, filed on Jan. 7, 2015.

(51) Int. Cl.
| | | |
|---|---|---|
| *G01S 1/00* | (2006.01) | |
| *G08G 5/00* | (2006.01) | |
| *G01S 1/04* | (2006.01) | |
| *G08G 5/02* | (2006.01) | |
| *G01S 19/03* | (2010.01) | |
| *G01S 19/13* | (2010.01) | |

(52) U.S. Cl.
CPC ............ *G08G 5/0013* (2013.01); *G01S 1/042* (2013.01); *G08G 5/0026* (2013.01); *G08G 5/025* (2013.01); *G01S 19/03* (2013.01); *G01S 19/13* (2013.01); *G08G 5/0056* (2013.01); *G08G 5/0078* (2013.01); *G08G 5/0086* (2013.01)

(58) Field of Classification Search
CPC .. G08G 5/0013; G08G 5/0026; G08G 5/0056; G08G 5/0086; G08G 5/025; G08G 5/0078; G01S 19/03; G01S 19/13; G01S 1/04; G01S 1/042
USPC .............................................. 342/357.4, 385
See application file for complete search history.

(56) References Cited

U.S. PATENT DOCUMENTS

| | | | | |
|---|---|---|---|---|
| H1560 H | * | 7/1996 | Gill .............................. 340/981 |
| 6,570,532 B2 | * | 5/2003 | Mise ..................... G01S 5/0036 342/357.4 |
| 8,072,374 B2 | * | 12/2011 | Hovey ..................... G08G 5/04 342/357.31 |
| 8,849,189 B1 | * | 9/2014 | Burmeister .............. H01Q 9/32 455/11.1 |
| 9,680,208 B1 | * | 6/2017 | Williams .............. H01Q 1/2291 |
| 10,249,938 B1 | * | 4/2019 | Williams .............. H01Q 1/2291 |
| 2002/0080565 A1 | * | 6/2002 | Teshima ................ G06F 1/1616 361/679.3 |
| 2005/0137942 A1 | * | 6/2005 | LaFleur ............. G06Q 30/0601 705/26.1 |
| 2007/0132583 A1 | * | 6/2007 | Sweeney, II ......... G06K 7/0008 340/572.1 |
| 2010/0197222 A1 | * | 8/2010 | Scheucher ............... H01Q 9/30 455/11.1 |
| 2010/0283661 A1 | * | 11/2010 | Strain ................... G01S 5/0072 342/30 |

(Continued)

*Primary Examiner* — Chuong P Nguyen
(74) *Attorney, Agent, or Firm* — Haynes and Boone, LLP

(57) ABSTRACT

A beacon system is disclosed. The beacon system includes a case that defines a compartment and a lid. Also, the beacon system includes a ground plane mount that is pivotally coupled to the case, a monopole antenna carried by the ground plane mount, and an ADS-B transmitter. In that regard, the ADS-B transmitter is disposed within the compartment and electrically coupled to the monopole antenna.

12 Claims, 5 Drawing Sheets

(56) References Cited

U.S. PATENT DOCUMENTS

2016/0225268 A1* 8/2016 DeBusk .............. H01Q 1/1207
2017/0024537 A1* 1/2017 Ferlito ............... G06F 19/3418
2019/0058259 A1* 2/2019 Scheucher ............ H01Q 19/30

* cited by examiner

AUTOMATIC DEPENDENT SURVEILLANCE BROADCAST SYSTEM BEACON AND METHOD

CROSS REFERENCE TO RELATED APPLICATIONS

The present application claims priority to and the benefit of the U.S. Provisional Patent Application No. 62/100,792, filed Jan. 7, 2015, which is hereby incorporated by reference in its entirety.

FIELD

The present disclosure relates generally to avionics, and more specifically to Automatic Dependent Surveillance Broadcast (ADS-B) systems.

BACKGROUND

ADS-B is an aircraft surveillance and traffic management technology and system for enhancing situational awareness, in which location messages are sent periodically by aircraft without the need for interrogation from a ground station. The system is dependent on aircraft being equipped with high integrity position sources, such as Wide Area Augmentation System (WAAS) Global Positioning System (GPS) receivers. ADS-B provides real-time surveillance services to both Air Traffic Control stations and to appropriately equipped aircraft.

ADS-B makes use of two operating frequencies-978 MHz and 1090 MHz: Aircraft may transmit position information (referred to as ADS-B OUT) at 1090 MHz using an Extended Squitter equipped transponder or, if limited to operating below flight level 180 (approximately 18,000 feet), at 978 MHz using Universal Access Transceiver (UAT). ADS-B OUT information may be directly received by other similarly-equipped aircraft and by ground stations within line-of-sight.

Aircraft may receive position information of other aircraft and about obstacles, as well as weather and other information (referred to as ADS-B IN). ADS-B equipped 1090 MHz aircraft may directly receive both position information from other ADS-B equipped 1090 MHz aircraft and Traffic Information Services Broadcasts (TIS-B) from ground stations. Similarly, ADS-B equipped 978 MHz aircraft may directly receive both position information from other ADS-B equipped 978 MHz aircraft and TIS-B from ground stations. TIS-B provides traffic and obstacle information within a cylindrical volume of airspace about the aircraft. TIS-B data includes self-reported position data from both 1090 MHz and 978 MHz ADS-B OUT equipped aircraft and basic position data from non-ADS-B OUT equipped aircraft within radar range of the ground station. Moreover, ADS-B equipped 978 MHz aircraft may receive Flight information Services Broadcasts (FIS-B) which includes subscription-free graphical and textual weather data. Due to congestion of the 1090 MHz frequency, FIS-B is only provided at 978 MHz.

BRIEF DESCRIPTION OF THE DRAWINGS

Embodiments are described in detail hereinafter with reference to the accompanying figures, in which.

DETAILED DESCRIPTION

Figure 1:
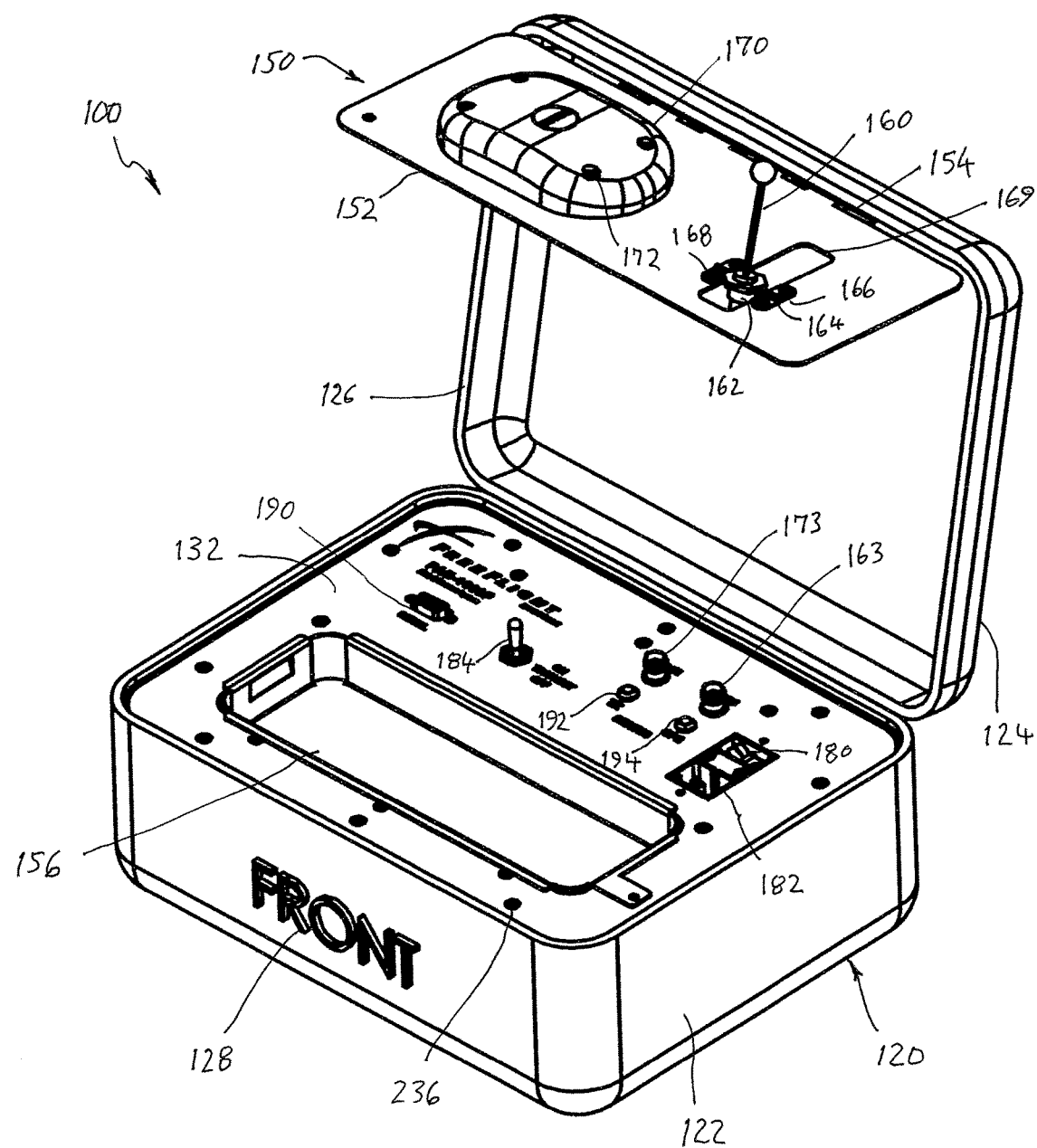
FIG. 1 is a perspective view of a portable ADS-B beacon system according to an embodiment, showing an ADS-B transceiver or transmitter and a GPS receiver housed in a portable ruggedized case with an articulated antenna assembly.
Figure 2:
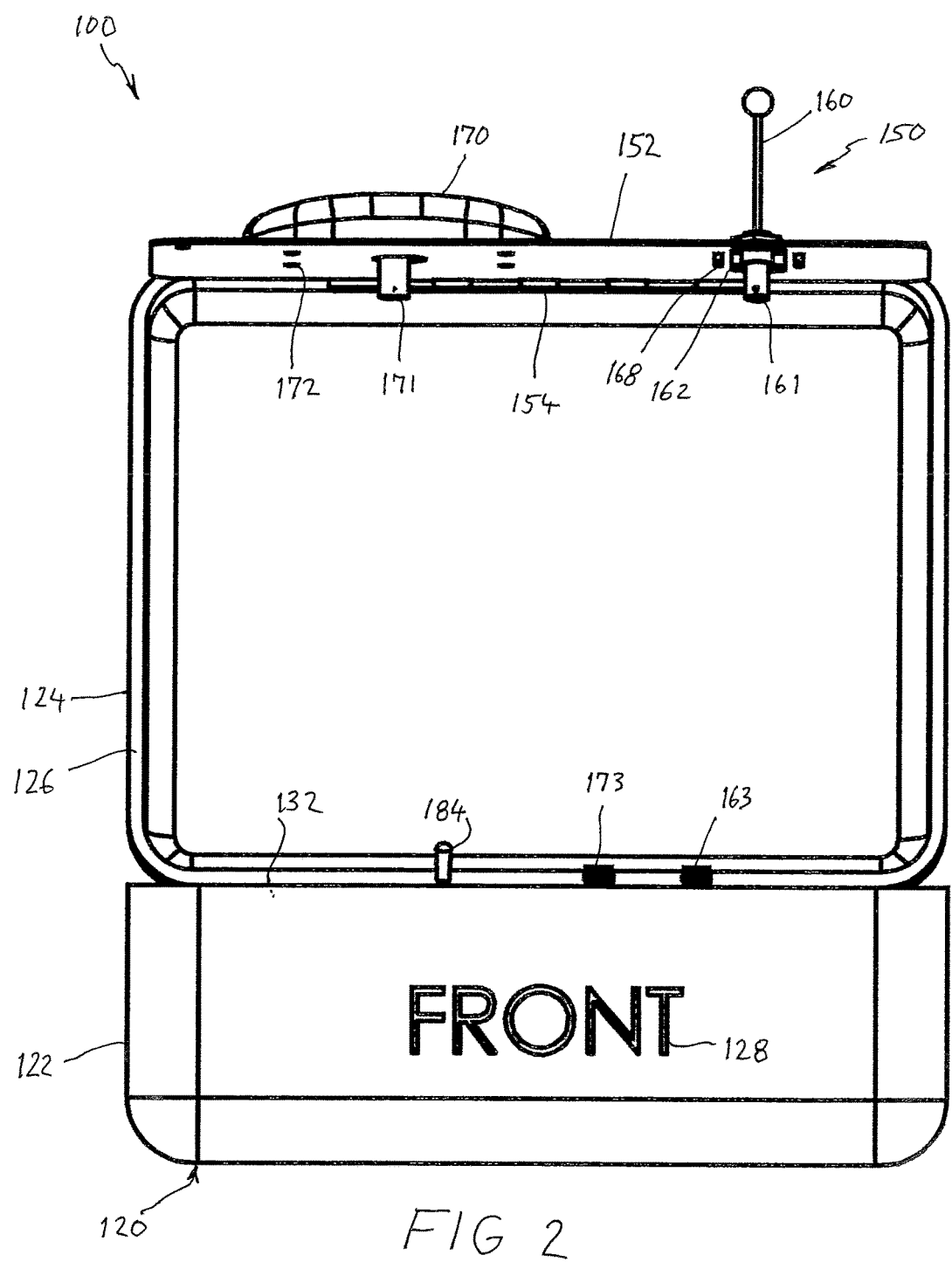
FIG. 2 is an elevation view of the front side of the ADS-B beacon system of FIG. 1.
Figure 3:
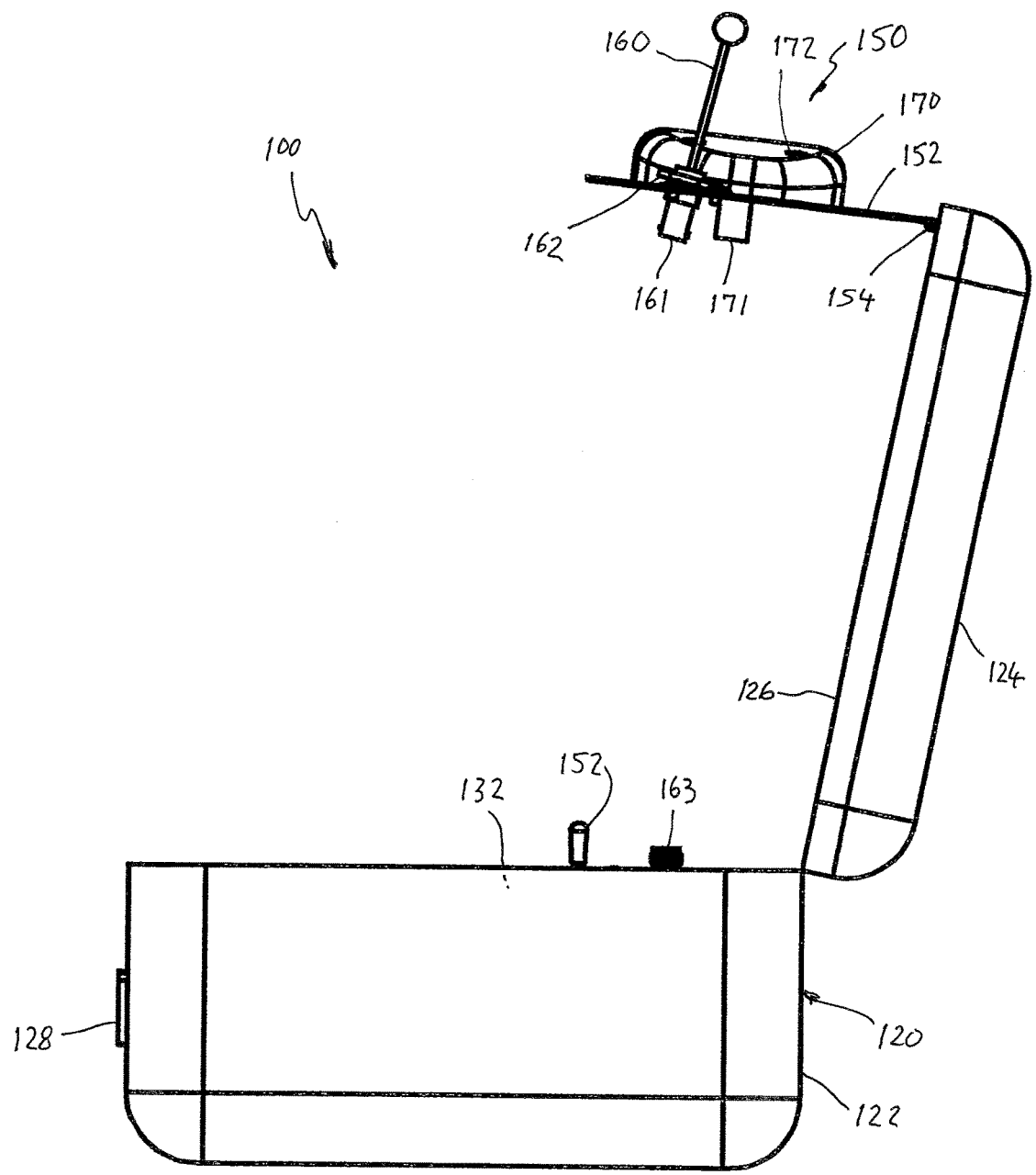
FIG. 3 is an elevation view of the right side of the ADS-B beacon system of FIG. 1.
Figure 4:
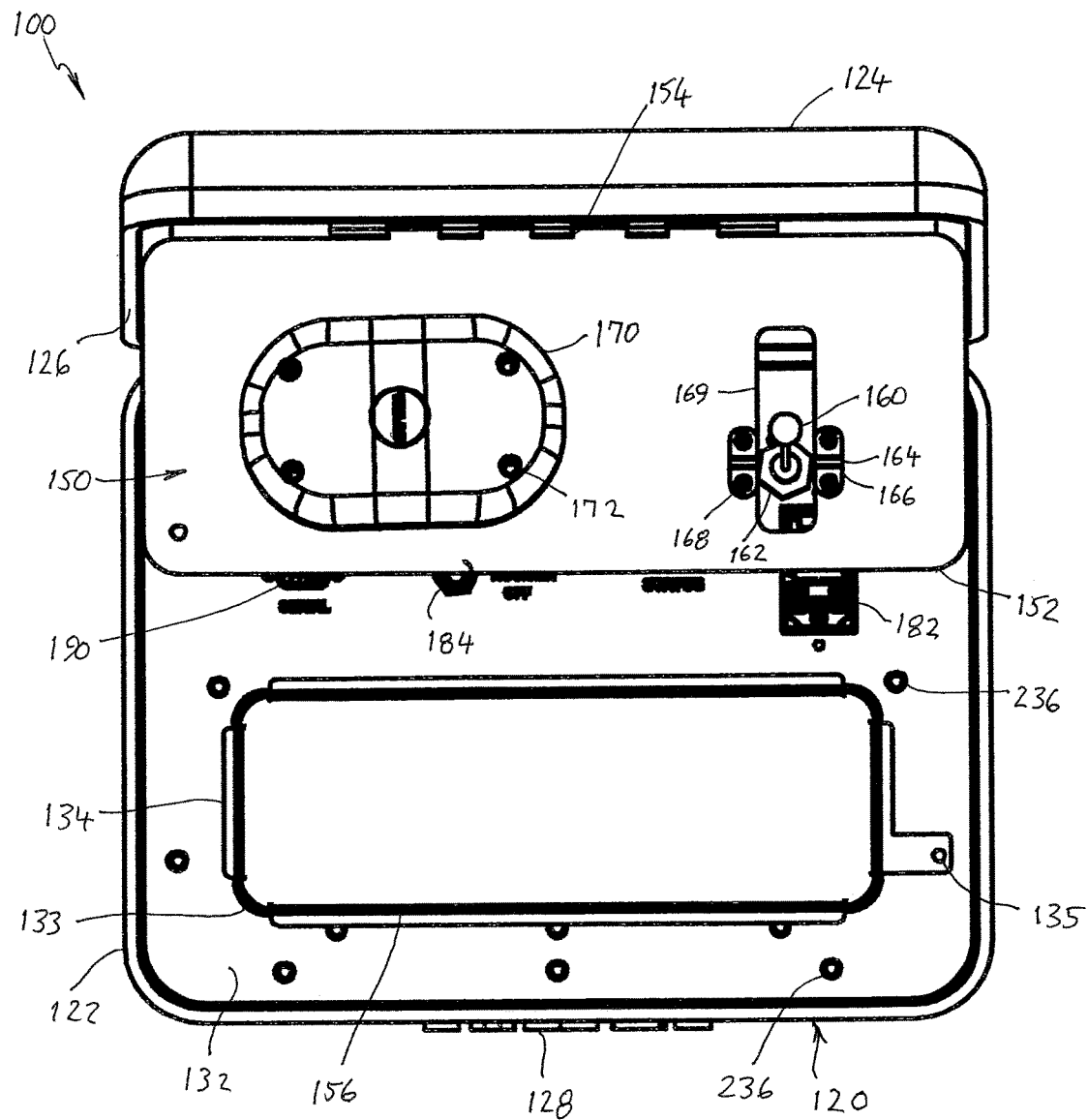
FIG. 4 is a plan view of the of the top side of the ADS-B beacon system of FIG. 1.

The present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "left," "right," "front," "back," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures.

As airspace becomes increasingly crowded, and as man-made obstacles to flight such as towers, antenna masts, weather balloons, buildings, cranes, power lines, drones, and the like become more prolific, often appearing quickly, ADS-B may offer pilots greater situational awareness for collision avoidance with such obstacles. As described herein, a portable ground-based ADS-B beacon may be rapidly provided at or on an obstacle for self-reporting position and identification of obstacle type, height, duration of obstruction, and other characteristics, so that the visibility of such objects is enhanced to aircraft operating in the vicinity. A portable ground-based ADS-B beacon may also be provided at ground stations, flight service stations, or the like to provide relevant flight information service data to aircraft, and by the military or emergency service providers for rapidly marking landing zones, waypoints, and/or nearby obstacles for life flight, rescue helicopter operations, and the like.

FIGS. 1-4 are perspective and orthogonal views, respectively, of an ADS-B beacon system 100 according to one or more embodiments of the invention. Beacon system 100 may be housed in a ruggedized case 120 having a lower compartment 122 and a hinged upper lid 124. Case 120 may be weatherproof and/or watertight, with a gasket 126 for sealing the lid/compartment interface. Case 120 may be made of a lightweight, impact-resistant polymer material for example. However, other suitable materials may be used as appropriate. Case 120 may be closed for transportation or stowage of the beacon and opened for beacon operation. Case 120 may also include embossed indicia 128 for indicating the case's correct orientation for convenience of the operator.

FIGS. 1-4 show case 120 is open to reveal control panel 132 and an antenna system 150 on an articulated ground plane mount 152. Ground plane mount 152 may be pivotally attached to lid 124 with a hinge 154. Hinge 154 may be a panel hinge, for example, but any suitable hinge mechanism may be used. Hinge 154 allows ground plane mount 152 to be folded within case 120 when in the closed position. A lever, clasp, rod, bungee, tie, arm, stop, pin, or other device (not illustrated) may be provided at ground plane mount 152 to keep ground plane mount 152 in a horizontal position during beacon operation. Ground plane mount 152 is preferably made of a ferromagnetic material, such as steel, to provide a ground plane surface for antenna system 150.

Antenna system 150 may include a 978 MHz or 1090 MHz (L-band) ¼ wavelength monopole ADS-B antenna 160 and a GPS receiver antenna 170. Antennas 160, 170 may be spaced apart to minimize electromagnetic coupling therebetween. ADS-B antenna 160 may be thread mounted at its grounded base to a carriage 162 equipped with trunnions 164. Trunnions 164 may in turn be mounted to ground plane mount 152 with U-clamps 166 and fasteners 168. Such a mounting arrangement allows ADS-B antenna 162 be folded parallel with ground plane mount 154 for stowage and to be rotated upwards during operation of beacon system 100. Carriage 162, trunnions 164, U-clamps 166, and fasteners 168 provide an electrical connection between the grounded base of ADS-B antenna 160 and ground plane mount 152. A cut out 169 may be provided in ground plane mount 152 to accommodate ADS-B antenna 160 when folded downward. GPS antenna 170 may be rigidly mounted to ground plane mount 152 using fasteners 172, such as machine screws, as is known in the art. When ADS-B antenna 160 is pivoted down toward ground plane mount 152, ground plane mount 152 may be pivoted into the lid of case 120. Control panel 132 may include a recessed cavity 156 to accommodate antenna system 150 in the folded, stowed position. Recessed cavity 156 may be formed by providing a cut out 133 in control panel 132 and mounting a shallow formed 134 pan therein with machine screw 135 or similar fastener.

The bottom end of ADS-B antenna 160 may include a coaxial connector 161, which may be connected to a coaxial connector 163 on control panel 132 with a short length of coaxial cable (not illustrated). Similarly, the bottom of GPS antenna 170 may include a coaxial connector 171, which may be connected to a coaxial connector 173 on control panel 132 with a short length of coaxial cable (not illustrated). Coaxial connectors 161, 171 may be bayonet or threaded Neill-Concelman (BNC, TNC) coaxial connectors or the like. However, any appropriate electrical connector system may be used. The use of removable antenna cabling allows antenna system 150 to be conveniently folded for stowage. The short lengths of antenna hookup cable may be wound and stored in recess cavity 156 or generally within case 120 when beacon system 100 is not in use.

Control panel 132 may include a master power switch 180 and a power receptacle 182 for providing power to beacon system 100. Master power switch 180 may be a rocker switch or any other suitable type of switch. Power receptacle 182 may be an IEC 60320 C13 receptacle, which is commonly used to connect computers and other business equipment to mains power. However other connector types may be used as appropriate. In an embodiment, master power switch 180 and power receptacle 182 may be an integrated unit. A disconnectable power lead (not illustrated) may be provided, which may be conveniently stored within case 120 when beacon system 100 is not in use.

Control panel 132 may also include two-position transmit switch 184. In the on position, transmit switch 184 enables broadcasting of ADS-B position data. In the off position, ADS-B transmission is disabled. In an embodiment, switch 184 is a safety switch, which may prevent inadvertent movement from either position. For example, switch 184 may be a locking toggle switch, wherein the toggle must be raised to raise a safety detent to actuate the switch from one position to the other. However, a safety switch cover may be used in place of a locking toggle switch.

Figure 5:
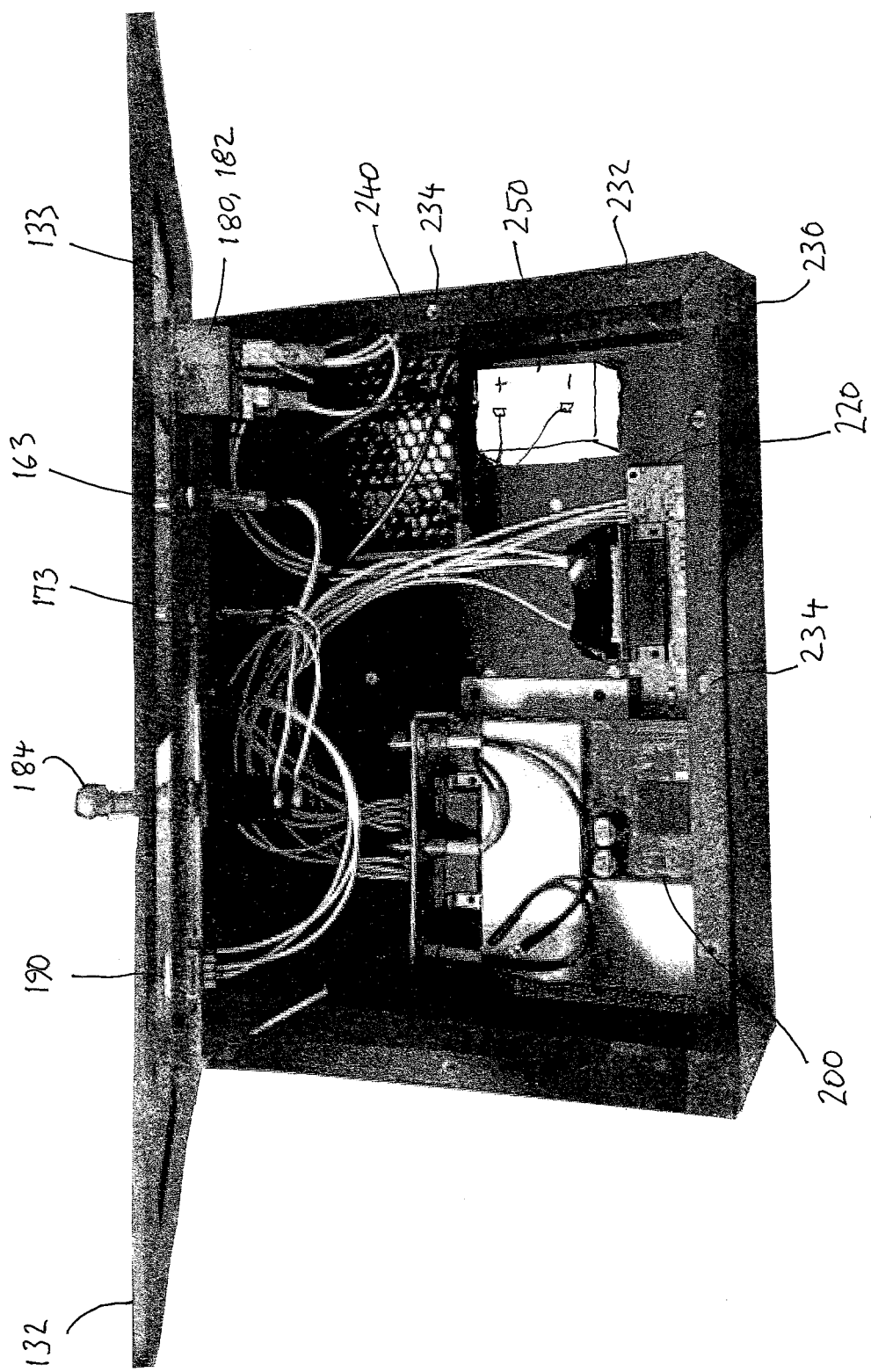
FIG. 5 is a perspective view of a chassis of the ADS-B beacon system of FIG. 1, showing an ADS-B transmitter/transceiver, a GPS receiver, a power supply, and a battery.

In one or more embodiments, control panel 132 may include a RS-232 serial port or universal serial bus (USB) port connector 190 programming and console mode operation of ADS-B transmitter/transceiver 200 and/or GPS receiver 220 (FIG. 5). In the embodiment illustrated, a nine pin D sub connector is provided. A human operator may program specific information regarding the obstacle or point marked by beacon system 100. For example, textual comments regarding the nature of what is marked by beacon system 100, the height of an antenna mast, the intended duration of the obstacle, or other useful information may be programmed for transmission to aircraft using the FIS-B protocol. Although a serial port communication scheme is illustrated, in one or more embodiments a Bluetooth, Zig-Bee, or other wireless system may be provided for communication with a tablet or smart phone operated by a user. Alternatively, a small keypad and screen (not illustrated) may be provided on control panel 132 for ADS-B programming purposes.

Control panel 132 may include other indicia useful to the operator. For example status lights or an audible annunciator may be provided. In the embodiment illustrated, ADS-B transmitter and GPS receiver status lights 192, 194, respectively, are provided. Such status lights may use light emitting diodes (LEDs), for example.

Referring now to FIG. 5, in an embodiment, compartment 122 of case 120 may house an ADS-B transmitter or transceiver 200 and a GPS receiver 220. ADS-B transmitter/transceiver 200 and GPS receiver 220 may be collocated as a single unit, or may be provided as separate units. ADS-B transmitter/transceiver 200 may be a 978 MHz UAT. Alternatively, ADS-B transmitter/transceiver 200 may use the 1090 MHz frequency band. GPS receiver 220 may be a WAAS receiver.

In one or more embodiments, ADS-B transmitter/transceiver 200 and GPS receiver 220 may be mounted within a chassis 230. Chassis 230 may be formed of steel or aluminum sheet-metal and may provide electromagnetic shielding to or from the electronic components located therein. However, any suitable material and manufacturing technique may be used to produce chassis 230. Chassis 230 may include a flange 232 with threaded holes 234 to provide a mounting surface for control panel 132. Control panel 132 may be secured to chassis 230 with machine screws 236 or other suitable fasteners. Chassis 230 may be dimensioned to snugly fit within compartment 122 of case 120. FIG. 5 illustrates the interior of chassis 230 to reveal the components therein. Control panel 132 is shown tilted upwards from chassis 230 with recess pan 156 removed.

Beacon system 100 may include a power supply 240, which may be mounted within chassis 230. Power supply 240 may be coupled to power receptacle 182 via master power switch 1802 convert alternating current (AC) power to low-voltage direct-current (DC) power suitable for ADS-B transmitter/transceiver 200 and GPS receiver 220. In an embodiment, power supply 240 is a regulated switching type power supply.

In one or more embodiments, beacon system 100 may also include a battery 250. Battery 250 may be a lithium ion, gel, lead acid, or other suitable type of battery. Battery 250 may be a rechargeable battery that may be charged or maintained in a charged condition by power supply 240. Battery 250 may be used to provide backup power to beacon system 100 upon loss of mains power. Alternatively, battery 250 may be used to power beacon system 100 during normal operation in installations where mains power is not available. Although not expressly illustrated, a battery health status light may be provided on control panel 132. The capacity of battery 250 may be chosen based on the anticipated needs of beacon system 100.

Various embodiments may include methods of use for beacon system 100. In one exemplary embodiment, a human operator may determine that it is appropriate to provide a beacon system 100 at a particular location. The operator may position beacon system 100 at the desired location, open lid 122 of case 120, and extend and secure ground plane mount 152 to a horizontal or near horizontal orientation. The operator may then pivot ADS-B antenna 162 to a vertical orientation. The operator may simply place beacon system 100 at the desired location, or the user may securely mount case 120 in place, such as with a tie-down strap, adhesive, or the like. Although not illustrated, case 120 may include handles, padeyes, or the like to facilitate mounting thereof.

Next, ADS-B antenna 160 may be electrically connected at coaxial connector 161 to coaxial connector 163 on control panel 132 using a short coaxial lead. Similarly, GPS antenna 170 may be electrically connected at coaxial connector 171 to coaxial connector 173 on control panel 132 using a short coaxial lead. Mains power may then be connected to power receptacle 182. Master power switch 180 may be toggled to the on position to energize beacon system 100. If mains power is not available, beacon system 100 may be operated using battery power if battery 250 is provided.

If desired, the operator may program one or more messages to be transmitted by the ADS-B transmitter/transceiver 200. To accomplish this, the operator may plug a console to connector 190. The console may be an electronic tablet, hand-held computer, smart phone, or legacy device, for example. Alternatively, if equipped, a wireless communication scheme may be used. The operator may program particular information useful to aircraft. For instance, in one embodiment a user may employ a tablet having an application thereon that allows settings to be selected and/or messages to be programmed. The user may provide input to the application on the tablet for selecting settings and messages. The user may then instruct the application to program transmitter/transceiver 200, and in response, the tablet may cause transmitter/transceiver 200 to store the selected settings and the messages in its local non-volatile memory. Transmitter/transceiver 200 may then, during operation, access the internal memory to apply the settings and the messages saved therein.

The operator may ascertain that a GPS fix has been obtained. If a GPS fix is not available, or GPS receiver 220 is not provided, the operator may manually program position coordinates to be broadcast (for example, using the technique described above with a tablet or other device). Beacon system 100 is then ready to transmit. Actuation of transmit switch 1842 the on position enables ADS-B transmitter/transceiver 200 to transmit ADS B data via ADS B antenna 160.

GPS receiver 220 receives accurate GPS location information via antenna 170, and ADS-B transmitter/transceiver 200 transmits position messages to aircraft within line of sight, thus enhancing pilot situational awareness and minimizing the chance of collision between aircraft and obstructions.

When beacon system 100 is no longer required at a particular location, the above sequence of steps may be reversed. Transmit switch 184 may be toggled to the off position, and master power switch 180 may be turned to the off position. The mains lead may be unplugged from power receptacle 182. Similarly coaxial leads may be disconnected from coaxial connectors 161, 163, 171, and 173. ADS-B antenna 160 may be pivoted parallel with ground plane mount 152, and ground plane mount 152 may be folded against the interior of lid 122. The various cords may be wound and stowed within recess cavity 156 or simply placed above control panel 132. Case 120 may then be closed. Beacon system 100 may then be removed from the location and used elsewhere as required.

In some examples, beacon system 100 is portable by a human user and can be removed from the location simply by the human user picking it up. The human user may then either store the beacon system 100 for use at another site in the future (or the same site), transfer beacon system 100 to someone else, or employee beacon system 100 at another site, and/or the like.

Various embodiments described above provide advantages for use over conventional systems. For instance, beacon system 100 may be compact and lightweight. Thus, a human user can quickly deploy beacon system 100 when and where it may be needed by, for example driving to an area close to a site of interest, caring the beacon from the vehicle to the site of interest, and manually setting up the beacon system. Examples of manually setting up the beacon system are given above. In some embodiments, case 120 of beacon system 100 may be dimensioned and be of suitable weight for hand-held use by a human user.

Another example of some embodiments includes the hinged ground plane with a monopole antenna rotatively disposed thereon. When unfolded, the ground plane and antenna may provide transmission and reception in the correct orientation. After use, the ground plane and antenna can be folded up compactly to be stowed in a closed, ruggedized carrying case.

The scope of embodiments is not limited to the particular method described above. Other embodiments may add, omit, rearrange, or modify one or more actions. Also, the example above refers to a human operator, though the scope of embodiments includes scenarios in which the various actions may be performed by different human users, machines, and/or a combination of humans and machines.

While various embodiments have been illustrated in detail, the disclosure is not limited to the embodiments shown. Modifications and adaptations of the above embodiments may occur to those skilled in the art. Such modifications and adaptations are in the spirit and scope of the invention.

What is claimed:

1. A beacon system, comprising:
   a case defining a compartment and a lid;
   a ground plane mount pivotally coupled to said lid using a hinge mechanism to allow the ground plane mount to pivot between a folded position and an unfolded position, and wherein the ground plane mount is horizontal in the unfolded position;
   a monopole antenna coupled to said ground plane mount; and
   an Automatic Dependent Surveillance-Broadcast (ADS-B) transmitter disposed within said compartment and electrically coupled to said monopole antenna.

2. The beacon system of claim 1, further comprising:
   a global positioning system antenna carried by said ground plane mount; and
   a global positioning system receiver disposed within said compartment and electrically coupled to said global positioning system antenna, said global positioning system receiver operably coupled with said ADS-B transmitter.

3. The beacon system of claim 1, wherein said monopole antenna is pivotally carried by said ground plane mount.

4. The beacon system of claim 3, wherein said monopole antenna can be pivoted parallel to the ground plane mount.

5. The beacon system of claim 3, wherein said ground plane mount includes a cutout into which the monopole antenna can fold.

6. The beacon system of claim 1, wherein said ground plane mount includes ferromagnetic material.

7. The beacon system of claim 1, wherein said case houses a control panel that includes a recessed cavity for accommodating the ground plane mount in the folded position.

8. The beacon system of claim 1, comprising:
an electronic memory configured to receive position information representing a location of the beacon system.

9. A method for enhancing safety, comprising:
disposing a beacon system in a case at a first location, the beacon system including a monopole antenna coupled to a ground plane mount that is pivotally coupled to a lid of the case using a hinge mechanism, and an Automatic Dependent Surveillance-Broadcast (ADS-B) transmitter electrically coupled to said monopole antenna;
pivoting the ground plane mount from a folded position to a generally horizontal unfolded position; and
operating said beacon system to transmit position information.

10. The method of claim 9, further comprising:
disposing a global positioning system antenna electrically coupled with a global positioning system receiver in the case; and
receiving location information by the global positioning system receiver.

11. The method of claim 9, further comprising:
pivoting said monopole antenna with respect to said ground plane mount.

12. The method of claim 9, wherein the first location is a fixed location.

* * * * *